(12) United States Patent
Xiao et al.

(10) Patent No.: US 10,031,516 B2
(45) Date of Patent: Jul. 24, 2018

(54) METHOD AND SYSTEM FOR AUTOMATICALLY COLLECTING SEMICONDUCTOR MANUFACTURING PARAMETERS

(71) Applicant: Semiconductor Manufacturing International (Shanghai) Corporation, Shanghai (CN)

(72) Inventors: Ke Xiao, Shanghai (CN); Jimin Zhu, Shanghai (CN); Lunguo Wang, Shanghai (CN); Yunfei Sui, Shanghai (CN); Xueqing Gao, Shanghai (CN)

(73) Assignee: SEMICONDUCTOR MANUFACTURING INTERNATIONAL (SHANGHAI) CORPORATION, Shanghai (CN)

( * ) Notice: Subject to any disclaimer, the term of this patent is extended or adjusted under 35 U.S.C. 154(b) by 418 days.

(21) Appl. No.: 14/671,565

(22) Filed: Mar. 27, 2015

(65) Prior Publication Data
US 2015/0287621 A1 Oct. 8, 2015

(30) Foreign Application Priority Data
Apr. 2, 2014 (CN) .......................... 2014 1 0131242

(51) Int. Cl.
G06F 7/66 (2006.01)
G06F 19/00 (2018.01)
(Continued)

(52) U.S. Cl.
CPC ..... *G05B 19/4183* (2013.01); *G05B 19/4184* (2013.01); *G05B 2219/31433* (2013.01);
(Continued)

(58) Field of Classification Search
CPC ............ G05B 19/4183; G05B 19/4184; G05B 2219/31433; G05B 2219/45031;
(Continued)

(56) References Cited

U.S. PATENT DOCUMENTS 5,685,912 A * 11/1997 Nishizaka ........... C23C 16/4412
118/715
2002/0134439 A1 * 9/2002 Kawasaki ........... C23C 16/4412
137/565.23
(Continued)

FOREIGN PATENT DOCUMENTS

TW 200414488 A 8/2004
WO 2013072760 A2 5/2013

OTHER PUBLICATIONS

Rui et al., "Quality and Reliability Assurance Techniques for Semiconductor Dies", 2013, Ordnance Industry Automation, abstract, pp. 1-3.*

*Primary Examiner* — Michael J Brown
(74) *Attorney, Agent, or Firm* — Anova Law Group, PLLC

(57) ABSTRACT

A method for automatically collecting semiconductor manufacturing parameters of a manufacturing equipment is provided. The method includes reporting semiconductor manufacturing parameters obtained by self-monitoring of the manufacturing equipment and obtaining storage locations in an electronic data capture corresponding to reported semiconductor manufacturing parameters and transporting the reported semiconductor manufacturing parameters and corresponding storage locations. The method further includes receiving the reported semiconductor manufacturing parameters and the corresponding storage location and storing each reported semiconductor manufacturing parameters automatically into the electronic data capture of a manufac-
(Continued)

turing execution system according to the corresponding storage location.

19 Claims, 9 Drawing Sheets

(51) Int. Cl.
*G01R 27/28* (2006.01)
*G21C 17/00* (2006.01)
*G06F 17/50* (2006.01)
*G05B 19/418* (2006.01)

(52) U.S. Cl.
CPC ..... *G05B 2219/45031* (2013.01); *Y02P 90/12* (2015.11); *Y02P 90/14* (2015.11); *Y02P 90/22* (2015.11); *Y02P 90/28* (2015.11)

(58) Field of Classification Search
CPC .......... G05B 15/02; Y02P 90/14; Y02P 90/12; Y02P 90/28; Y02P 90/22
USPC ..... 700/109, 121, 108; 702/118, 183; 716/4, 716/12, 51, 110, 118, 122
See application file for complete search history.

(56) References Cited

U.S. PATENT DOCUMENTS

2004/0152233 A1* 8/2004 Nemets ................. B23K 26/04
 438/106
2014/0271083 A1* 9/2014 Caveney ........... H01L 21/67173
 414/749.5

* cited by examiner

METHOD AND SYSTEM FOR AUTOMATICALLY COLLECTING SEMICONDUCTOR MANUFACTURING PARAMETERS

CROSS-REFERENCES TO RELATED APPLICATIONS

This application claims the priority of Chinese patent application no. CN201410131242.4, filed on Apr. 2, 2014, the entire contents of which are incorporated herein by reference.

FIELD OF THE INVENTION

The present invention relates to the field of semiconductor manufacturing technology and, more particularly, relates to a method and system for automatically collecting semiconductor manufacturing parameters.

BACKGROUND

In semiconductor manufacturing processes, to avoid human intervention in data inputting/outputting, automated data collection becomes more and more frequently used. Existing data collection systems often, based on a predefined process flow and after control or dummy wafers (C/DWs) are processed and measured in corresponding manufacturing equipment, transfer the processed and measured information to an electronic data capture (EDC) system to be recorded. However, some data in the semiconductor manufacturing process, such as data from self-check of the manufacturing equipment, often is not part of the data obtained by processing and measuring the C/DWs. Thus, using the existing data collection system, such data often cannot be collected by the automatic data collection systems based on the C/DWs, and may have to be manually inputted or outputted. Thus, data obtained from self-check of the manufacturing equipment may be easily missed out or manually changed for existing data collection systems, not being able to reflect actual status of the semiconductor manufacturing processes.

Therefore, a novel method and system for semiconductor manufacturing parameter collection may be needed for automatically collecting the semiconductor manufacturing parameters obtained from self-check or self-monitoring of semiconductor manufacturing equipment. The disclosed method is directed to solve one or more problems set forth above and other problems.

BRIEF SUMMARY OF THE DISCLOSURE

One aspect of the present disclosure provides a method for automatically collecting semiconductor manufacturing parameters of a manufacturing equipment. The method includes reporting semiconductor manufacturing parameters obtained by self-monitoring of the manufacturing equipment and obtaining storage locations in an electronic data capture corresponding to reported semiconductor manufacturing parameters and transporting the reported semiconductor manufacturing parameters and corresponding storage locations. The method further includes receiving the reported semiconductor manufacturing parameters and the corresponding storage location and storing each reported semiconductor manufacturing parameters automatically into the electronic data capture of a manufacturing execution system according to the corresponding storage location.

Another aspect of the present disclosure provides a system for collecting semiconductor manufacturing parameters. The system includes an equipment parameter reporting module, a parameter transporting module, and a parameter receiving module. The equipment parameter reporting module is configured to report semiconductor manufacturing parameters obtained from self-monitoring of the manufacturing equipment. The parameter transporting module is configured to obtain storage location in an electronic data capture for each reported semiconductor manufacturing parameter and transport the reported semiconductor manufacturing parameters and corresponding storage locations. The parameter receiving module is configured to receive the reported semiconductor manufacturing parameters and the corresponding storage locations and store each reported semiconductor manufacturing parameter automatically into the electronic data capture of a manufacturing execution system according to the corresponding storage location of each reported semiconductor manufacturing parameter.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In existing semiconductor manufacturing, data obtained from self-monitoring of manufacturing equipment may not be collected automatically. To solve this problem, the present disclosure provides a technical solution for automatically collecting semiconductor manufacturing parameters obtained from self-monitoring of manufacturing equipment. First, a parameter reporting module reports the actual semiconductor manufacturing parameters obtained from the self-monitoring of manufacturing equipment to a parameter transporting module.

The parameter transporting module obtains storage locations of the reported actual semiconductor manufacturing parameters, and sends the reported semiconductor manufacturing parameters and the corresponding storage locations to a parameter receiving module. The corresponding storage locations of the semiconductor manufacturing parameters refer to the storage locations in electronic data capture (EDC) of the semiconductor manufacturing equipment.

The parameter receiving module stores the semiconductor manufacturing parameters in the EDC of a manufacturing execution system (MES) based on the corresponding storage locations.

Thus, the above technical solution realizes automated inputting and outputting of the data obtained from the self-monitoring of the manufacturing equipment, and eliminates missing data and manually-changed data in semiconductor manufacturing processes. Thus, the actual status of the semiconductor manufacturing processes can be more accurately reflected, production efficiency can be improved, and production quality management and manufacturing management can be improved.

Figure 6:
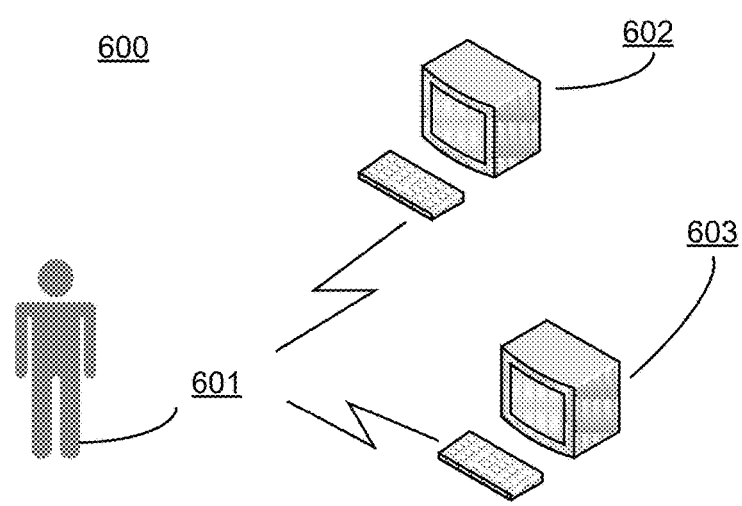
FIG. 6 illustrates an exemplary operation environment incorporating certain embodiments of the present invention.

FIG. 6 illustrates an exemplary operation environment incorporating certain embodiments of the present disclosure. As shown in FIG. 6, the operation environment 600 may include an operator (or a processing engineer) 601 and various manufacturing equipment 602 and 603. The manufacturing equipment 602/603 can have self-monitoring function and automated semiconductor manufacturing parameter collection functions such that the operator/process engineer can perform self-monitoring and automated semiconductor manufacturing parameter collection on the manufacturing equipment. For example, in FIG. 6, an operator 601 may confirm self-monitoring in manufacturing equipment 602 (or 603) by inputting commands into the manufacturing equipment. The operator may click on suitable buttons on the manufacturing equipment to select the semiconductor manufacturing parameters to be monitored. The manufacturing equipment 602 or 603 may be any suitable manufacturing equipment having semiconductor manufacturing functions, such as wafer-processing equipment, testing equipment and/or assembly and packaging equipment.

The manufacturing equipment 602 or 603 may include an automated data collection system to accept, process, and execute commands. The manufacturing equipment 602 or 603 may each have self-monitoring devices, such as flow meters in vacuums and/or mass flow controllers in gas lines, to obtain data in the self-monitoring and communicate with the automated data collection system. Semiconductor manufacturing parameters collected by self-monitoring devices can be sent to the automated data collection system. The self-monitoring devices can be any suitable built-in modules or external devices with self-monitoring functions.

Figure 7:
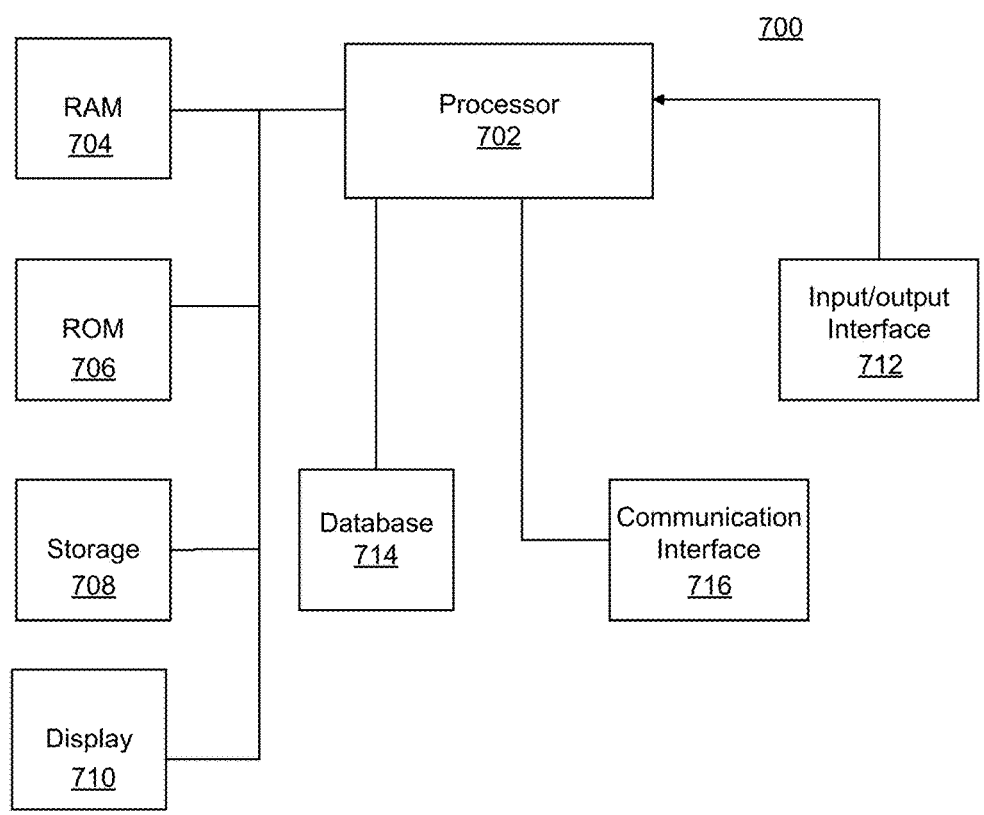
FIG. 7 illustrates a block diagram of an exemplary automated data collection system consistent with the disclosed embodiments.

FIG. 7 illustrates a block diagram of an exemplary automated data collection system 700 to accept, process, and execute commands from the operator or outside environment. The automated data collection system 700 may include any appropriately configured computer system. As shown in FIG. 7, system 700 may include a processor 702, a random access memory (RAM) unit 704, a read-only memory (ROM) unit 706, a storage unit 708, a display 710, an input/output interface unit 712, a database 714; and a communication interface 716. Other components may be added and certain devices may be removed without departing from the principles of the disclosed embodiments.

Processor 702 may include any appropriate type of general purpose microprocessor, digital signal processor or microcontroller, and application specific integrated circuit (ASIC). Processor 702 may execute sequences of computer program instructions to perform various processes associated with system 700. Computer program instructions may be loaded into RAM 704 for execution by processor 702 from read-only memory 706, or from storage 708. Storage 708 may include any appropriate type of mass storage provided to store any type of information that processor 702 may need to perform the processes. For example, storage 708 may include one or more hard disk devices, optical disk devices, flash disks, or other storage devices to provide storage space.

Display 710 may provide information to a user or users, e.g., an operator and/or a processing engineer, of system 700. Display 710 may include any appropriate type of computer display device or electronic device display (e.g., CRT or LCD based devices). Input/output interface 712 may be provided for users to input information into system 700 or for the users to receive information from system 700. For example, input/output interface 712 may include any appropriate input device, such as a keyboard, a mouse, an electronic tablet, voice communication devices, or any other optical or wireless input devices. Further, input/output interface 712 may receive from and/or send to other external devices.

Further, database 714 may include any type of commercial or customized database, and may also include analysis tools for analyzing the information in the databases. Database 714 may be used for storing information for semiconductor manufacturing and other related information. Communication interface 716 may provide communication connections such that system 700 may be accessed remotely and/or communicate with other systems through computer networks or other communication networks via various communication protocols, such as transmission control protocol/internet protocol (TCP/IP), hyper text transfer protocol (HTTP), etc.

In one embodiment, an operator or a process engineer may input commands on the input/output interface 712 to start self-monitoring and subsequent automated semiconductor manufacturing parameter collection process. The processor 702 may accept, process, and execute the commands to obtain data from self-monitoring devices. The communication interface can communicate with self-monitoring device to collect and process data obtained from the self-monitoring. Suitable data may be stored in ROM 706 and storage 708 to be processed. After the data is processed, result of the self-monitoring can be obtained. The result can be returned to the operator/process engineer via the display 710 or the input/output interface 712.

Figure 1:
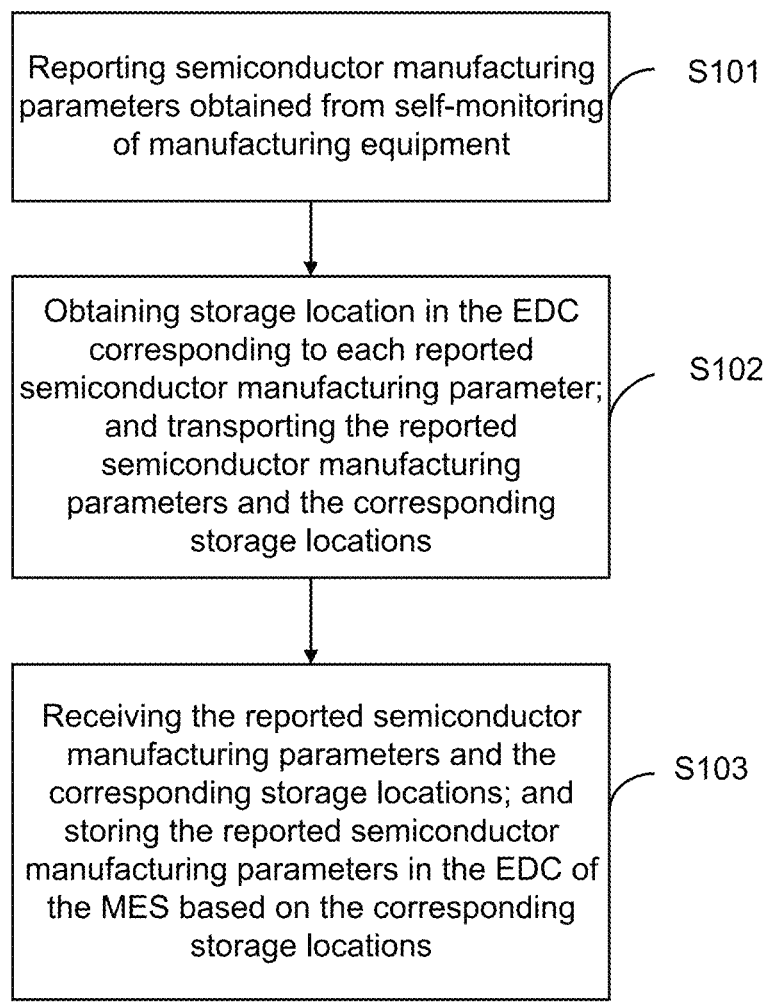
FIG. 1 illustrates a flow chart of an exemplary semiconductor manufacturing parameter collection process consistent with the disclosed embodiments.
Figure 2:
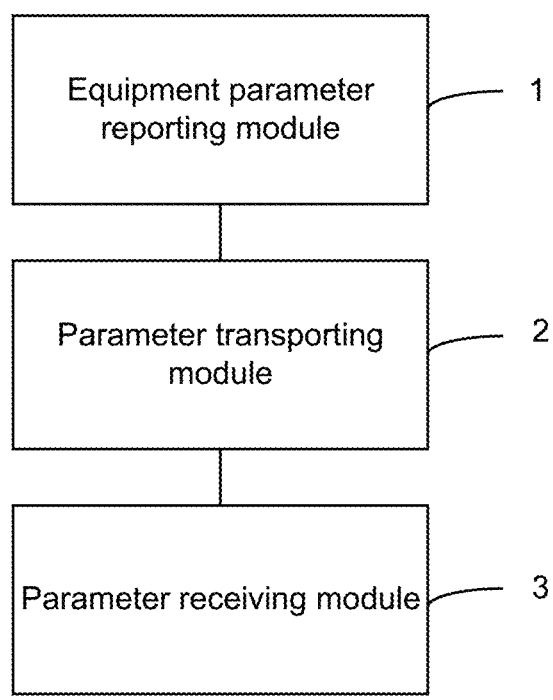
FIG. 2 illustrates a block diagram of an exemplary semiconductor manufacturing parameter collection system consistent with the disclosed embodiments.

In operation, the automated data collection system may perform certain processes to automatically collect semiconductor manufacturing parameters. FIG. 1 illustrates a flow chart of an exemplary semiconductor manufacturing parameter collection process 100, and FIG. 2 illustrates a functional/structural block diagram of an exemplary semiconductor manufacturing parameter collection system corresponding to the process shown in FIG. 1.

As shown in FIG. 1, at the beginning of the process 100, semiconductor manufacturing parameters obtained from self-monitoring of manufacturing equipment may be reported (S101).

In semiconductor manufacturing processes, semiconductor manufacturing parameters obtained from self-monitoring of manufacturing equipment may include a plurality of measured parameters. For example, the parameters obtained may include leakage rates of vacuum chambers and/or flow rates of mass flow controllers (MFC) of gas lines, etc.

In practice, the self-monitoring manufacturing equipment may correspond to one or more vacuum chambers and may also correspond to one or more gas lines. That is, the data obtained from the self-monitoring of the manufacturing equipment may include semiconductor manufacturing parameters representing one or more vacuum chambers in the manufacturing equipment. The data obtained from the self-monitoring of the manufacturing equipment may also include semiconductor manufacturing parameters representing one or more gas lines in the manufacturing equipment.

In S101, the parameters reported can be the actual semiconductor manufacturing parameters obtained after a self-monitoring or self-check is completed on the manufacturing equipment.

After the self-monitoring is completed, a plurality of semiconductor manufacturing parameters may be obtained. A state variable identifier (SVID) and a collected event identifier (CEID) can be assigned to each semiconductor manufacturing parameter to uniquely identify each semiconductor manufacturing parameter.

Further, referring to FIG. 1, after the semiconductor manufacturing parameters are obtained, storage location in the EDC corresponding to each semiconductor manufacturing parameter may be obtained, and the semiconductor manufacturing parameters and the corresponding storage locations may be transported (S102).

In S102, based on the SVID and the CEID of each reported semiconductor manufacturing parameter, a monitoring parameter type or measurement specification identifier (SPEC ID) for each reported semiconductor manufacturing parameter may be obtained. The SPEC ID can represent the type of the data reported. For example, a SPEC ID can reflect whether the corresponding semiconductor manufacturing parameter is a leakage rate or a flow rate.

In addition, each manufacturing equipment may have an equipment identifier (EQPID).

Based on the EQPID of the manufacturing equipment and the SPEC IDs of the semiconductor manufacturing parameters, a plurality of character identifiers (Chart IDs) suitable for the reported semiconductor manufacturing parameter can be obtained from the EDC. In other words, a plurality of Chart IDs configured to represent a certain SPEC ID (e.g., leakage rate) in a certain manufacturing equipment can be stored in the EDC. For example, the manufacturing equipment may correspond to more than one vacuum chambers, and the unique Chart ID of a reported semiconductor manufacturing parameter may be used to identify a certain vacuum chamber in the manufacturing equipment corresponding to the reported semiconductor manufacturing parameter. The unique Chart ID may correspond to the storage location of the reported semiconductor manufacturing parameter. The unique Chart ID of the reported semiconductor manufacturing parameter can be determined according to the SVID and the CEID of the semiconductor manufacturing parameter.

It can be understood that, the above method for obtaining the storage locations in the EDC for the reported semiconductor manufacturing parameters is only illustrative. Other methods may also be used. After the above reported data and the corresponding storage locations are obtained, the reported semiconductor manufacturing parameters and the corresponding storage locations can be transported.

Further, referring to FIG. 1, after the reported semiconductor manufacturing parameters and the corresponding storage locations are transported, the reported semiconductor manufacturing parameters and the corresponding storage locations may be received by the MES system, and the reported semiconductor manufacturing parameters may be stored in the EDC of the MES based on the storage location of each semiconductor manufacturing parameter (S103).

Specifically, the MES can store each reported semiconductor manufacturing parameter in the corresponding storage location in the EDC based on the unique Chart ID of the semiconductor manufacturing parameter. The storage location of each semiconductor manufacturing parameter may be identified by the unique Chart ID of the semiconductor manufacturing parameter.

Through the above steps, S101-S103, a plurality of reported semiconductor manufacturing parameters obtained from the self-monitoring can be stored in the EDC according to a uniform rule/format. The data reporting, data transporting, and data receiving can be performed automatically. No manual inputting/outputting of data is involved such that missing data and manually-changed data can be eliminated. Thus, the status of the semiconductor manufacturing processes can be more accurately reflected.

In accordance with the above disclosed method for automated semiconductor manufacturing parameter collection, the present disclosure also provides a system. As shown in FIG. 2, the system for automatically collecting semiconductor manufacturing parameters may include an equipment parameter reporting module 1, a parameter transporting module 2, and a parameter receiving module 3. Other modules may also be included.

The equipment parameter reporting module 1 may be configured to report the semiconductor manufacturing parameters obtained from the self-monitoring of manufacturing equipment. In the equipment parameter reporting module 1, self-monitoring devices may be needed. The self-monitoring devices may have the function of triggering the data reporting function after self-monitoring is completed. Suitable software and updates on the software may be needed for the self-monitoring and related data collecting and reporting functions.

The parameter transporting module 2 may be configured to obtain the storage location in the EDC corresponding to each semiconductor manufacturing parameter obtained, and to transfer the semiconductor manufacturing parameters and the corresponding storage locations. The parameter transporting module 2 can transport the reported data to the MES according to a certain format.

Further, the parameter receiving module 3 may be configured to receive the semiconductor manufacturing parameters and the corresponding storage locations, and to store the semiconductor manufacturing parameters into the EDC of the MES based on the storage location of each semiconductor manufacturing parameter.

In some embodiments, the parameter receiving module 3 in the MES can receive certain types of reported data transported by the parameter transporting module 2. After the transported data is received, the MES can compare the transported data with corresponding criteria. The result of the comparison can be used to determine the frequency of self-monitoring for certain semiconductor manufacturing parameters, e.g., leakage rates in flow meters and/or flow rates in mass flow controllers.

Further, the manufacturing equipment may correspond to one or more vacuum chambers and/or one or more gas lines. The manufacturing equipment may correspond to one equipment parameter reporting module 1.

The equipment reporting module 1, the parameter transporting module 2, and the parameter receiving module 3 can be incorporated to an existing data collecting system for automatically collecting semiconductor manufacturing parameters. The equipment reporting module 1, the parameter transporting module 2, and the parameter receiving module 3 can also form an independent system for automatically collecting semiconductor manufacturing parameters in manufacturing equipment.

In one embodiment, the equipment parameter reporting module 1 may be triggered/enabled by a self-monitoring device in the manufacturing equipment. That is, the self-monitoring device of each vacuum chamber or each gas line may report the semiconductor manufacturing parameters obtained immediately after self-monitoring is completed. In certain other embodiments, potential abnormal parameters may be filtered out by other suitable devices after the self-monitoring to trigger the parameter reporting module 1.

In practice, a self-monitoring device may include a leakage rate measuring device in a vacuum chamber, or a mass flow controller in a gas line, and so on.

In accordance with the method for automated semiconductor manufacturing parameter collection, in addition to reporting the actual semiconductor manufacturing parameters obtained from the self-monitoring of the manufacturing equipment, the equipment parameter reporting module 1 may also report the SVID and CEID of each semiconductor manufacturing parameter. Based on the SVID and the CEID, the monitoring parameter type or SPEC ID of each semiconductor manufacturing parameter may be obtained.

The parameter transporting module 2 may be installed separately or may be a sub-module of an equipment automation programming (EAP) module. If the parameter transporting module 2 is a sub-module of the EAP module, the parameter transporting module can take advantage of the existing EAP module in the manufacturing equipment and transform the actual reported semiconductor manufacturing parameters into formatted data. The function of the EAP module can be optimized.

Further, each manufacturing equipment may have an equipment identifier (EQPID). Each manufacturing equipment may correspond to one parameter transporting module 2.

After the parameter transporting module 2 receives a request for data transporting, the parameter transporting module 2 may send a request to the MES for all Chart IDs suitable for the reported semiconductor manufacturing parameters based on the EQPID of the manufacturing equipment and the SPEC IDs of the semiconductor manufacturing parameters. After receiving the request from the parameter transporting module 2, the MES may obtain all Chart IDs suitable for the reported semiconductor manufacturing parameters from the EDC and send the Chart IDs to the parameter transporting module 2. Based on the SVID and the CEID of each semiconductor manufacturing parameter, the parameter transporting module 2 may obtain a unique Chart ID suitable for each reported semiconductor manufacturing parameter from all the Chart IDs received. The unique Chart ID may correspond to the storage location of one reported semiconductor manufacturing parameter.

For example, a plurality of Chart IDs, representing a certain SPEC ID (e.g., leakage rate) in a certain manufacturing equipment, may be stored in the EDC of the MES. One manufacturing equipment may correspond to a plurality of vacuum chambers. Based on the SVID and the CEID of each reported semiconductor manufacturing parameter, the vacuum chamber corresponding to each reported semiconductor manufacturing parameter may be determined. That is, the unique storage location of each reported semiconductor manufacturing parameter in the EDC may be determined.

The parameter receiving module 3 may be installed separately or may be a sub-module of the MES.

The parameter receiving module 3 may store the reported semiconductor manufacturing parameters in corresponding storage locations in the EDC. A plurality of equipment parameter reporting modules 1 and a plurality of parameter transporting modules 2 may correspond to one parameter receiving module 3.

In one embodiment, the equipment parameter reporting module 1, the parameter transporting module 2, and the parameter receiving module 3 may be formed in the computer system of the automated data collection system. The equipment parameter reporting module 1, the parameter transporting module 2, and the parameter receiving module 3 may be assigned to appropriate segments of the computer system such that each module can have desired functions. The equipment parameter reporting module 1 may communicate with self-monitoring devices to allow data, e.g., semiconductor manufacturing parameters, to be sent to the automated data collection system such that the parameter transporting module 2 and the parameter receiving module 3 can process the data and execute related commands.

Figure 8:
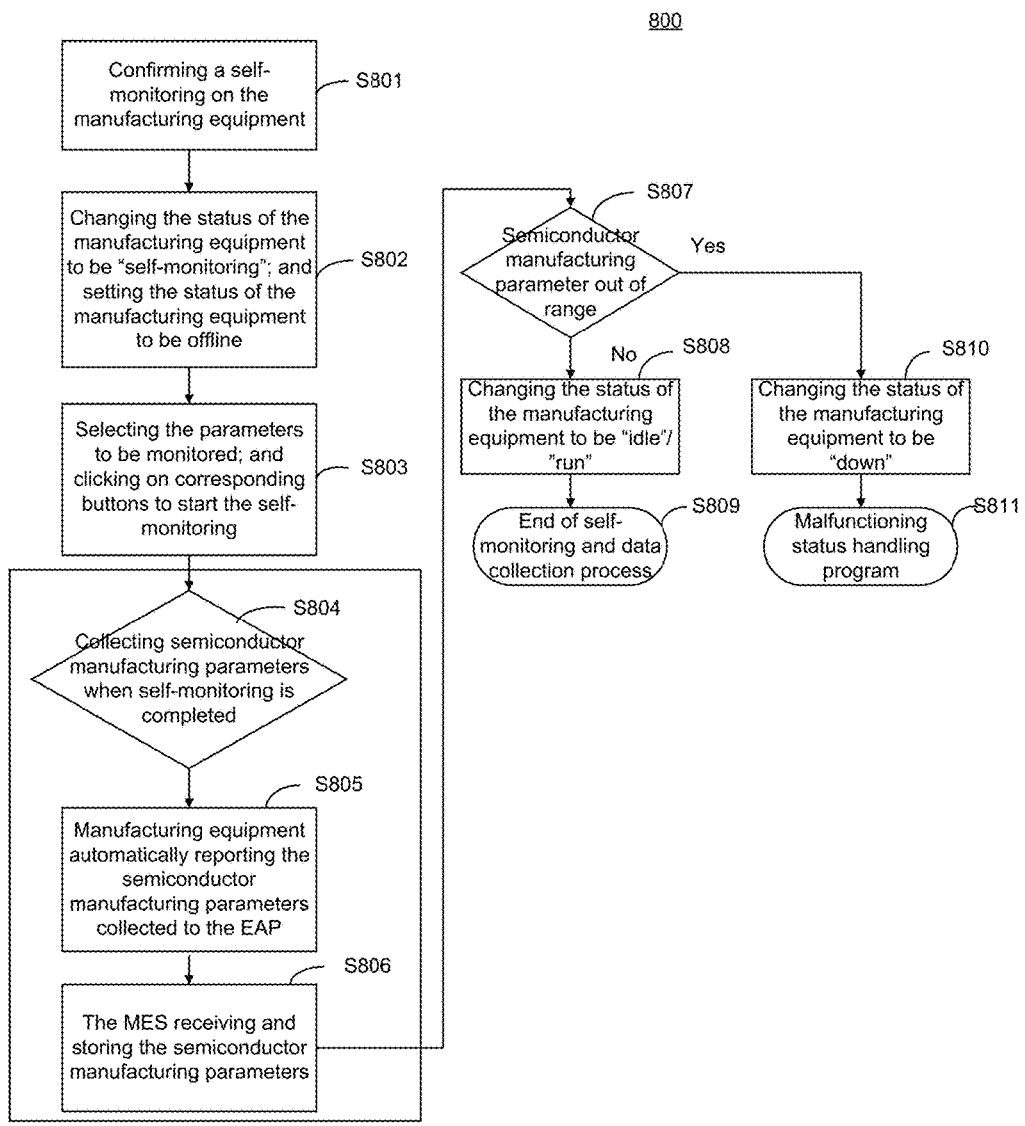
FIG. 8 illustrates a flow chart of another exemplary semiconductor manufacturing parameter collection process consistent with the disclosed embodiments.

FIG. 8 illustrates flow chart of an exemplary semiconductor manufacturing parameter collection process 800 for automated data reporting, data transporting, and data receiving. The following steps can be included in the process 800.

Step S801, an operator can confirm self-monitoring or self-check of a manufacturing equipment.

Step S802, the operator can change the status of the manufacturing equipment to be "self-monitoring" and set the status of the manufacturing equipment to be "offline" to allow data collection.

Step S803, the operator can select the semiconductor manufacturing parameters to be monitored, for example, leakage rates and/or flow rates, by clicking on corresponding buttons on the manufacturing equipment to start the self-monitoring.

Step S804, the manufacturing equipment can collect semiconductor manufacturing parameters when the self-monitoring is completed.

Step S805, the manufacturing equipment can automatically report the semiconductor manufacturing parameters obtained to the EAP.

Step S806, the MES can receive and store the semiconductor manufacturing parameters.

Step S807, the MES can determine whether a semiconductor manufacturing parameter is out of range based on predetermined criteria. If the semiconductor manufacturing parameter is out of range, the process goes to step S810. If the semiconductor manufacturing parameter is within the range, the process goes to step S808.

Step S808, the status of the manufacturing equipment can be changed to be "idle" or "run" according to actual situations, and the process goes to step 809.

Step S809, the self-monitoring of the manufacturing equipment and the automated semiconductor manufacturing parameter collection process are completed.

Step S810, the status of the manufacturing equipment can be changed to be "down", and the process goes to step 811.

Step S811, the manufacturing equipment can be set to be in a "malfunctioning status handling program".

Specifically, automated data reporting, data transporting, and data receiving can be performed through steps S804, S805, and S806. The semiconductor manufacturing parameter collection process 800 can be performed by the system illustrated in FIG. 2. An operator can determine appropriate settings before the self-monitoring starts through steps S801 to S803. After the self-monitoring starts in step S803, the manufacturing equipment can automatically collect semiconductor manufacturing parameters through steps S804 to S806 and determine the status of the manufacturing equipment through steps S807 to S811.

Figure 3:
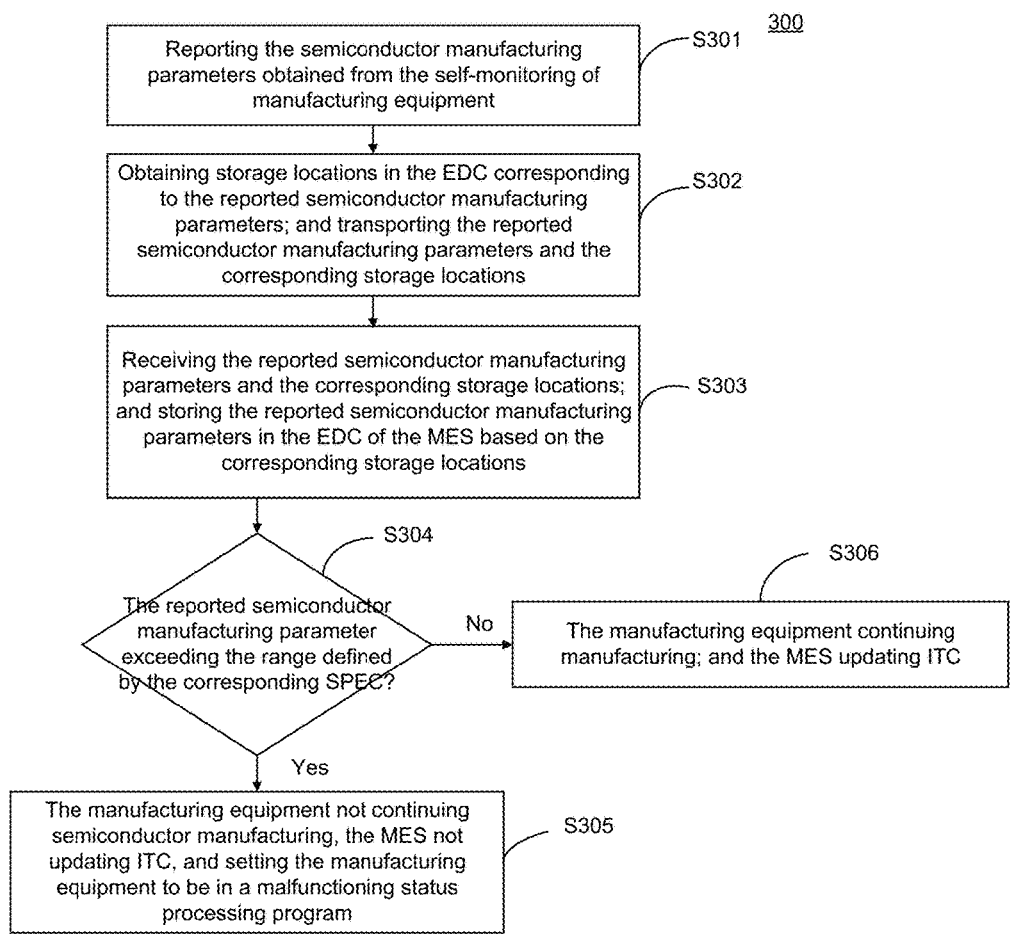
FIG. 3 illustrates a flow chart of another exemplary semiconductor manufacturing parameter collection process consistent with the disclosed embodiments.

FIG. 3 illustrates a flow chart of another exemplary semiconductor manufacturing parameter collection process 300. Compared to the semiconductor manufacturing parameter collection process illustrated in FIG. 1, the process 300 may further include steps to determine whether a reported semiconductor manufacturing parameter is out of range, and whether the manufacturing equipment corresponding to the reported semiconductor parameter should continue manufacturing. Steps S301, S302 and S303 in FIG. 3 may correspond to steps S101, S102, and S103 in FIG. 1 for automatically collecting semiconductor manufacturing parameters obtained from the self-monitoring of the manufacturing equipment.

Specifically, the allowable specification (SPEC) for each reported semiconductor parameter may also be stored in the storage location of each semiconductor manufacturing parameter in the EDC. The SPEC for each reported semiconductor manufacturing parameter may be obtained according to the unique Chart ID of the semiconductor manufacturing parameter.

In the process 300, a comparison between a reported semiconductor manufacturing parameter and the corresponding SPEC may be used to determine whether the reported semiconductor manufacturing parameter exceeds the range defined by the SPEC (step S304). If the reported semiconductor manufacturing parameter does not exceed the range defined by the corresponding SPEC, the process goes to step S306. If the reported semiconductor manufacturing parameter exceeds the range defined by the corresponding SPEC, the process goes to step S305.

In step S305, the MES may stop the vacuum chambers and/or the gas lines corresponding to the manufacturing equipment from continuing semiconductor manufacturing, and may not update the ITC of the semiconductor manufacturing parameter. Also, the MES may set the vacuum chambers and/or the gas lines corresponding to the manufacturing equipment to be in a malfunctioning status handling program.

In step S306, the MES may allow the vacuum chambers and/or the gas lines corresponding to the manufacturing equipment to continue manufacturing, and may update the idle time constraint (ITC, i.e., the idle time interval before the next self-monitoring) of the semiconductor manufacturing parameter.

The semiconductor manufacturing parameter collection process above can provide a detailed solution for determining whether manufacturing equipment can continue manufacturing. For example, the method can provide a detailed solution for determining whether manufacturing equipment can continue processing wafers.

In addition to comparing the actual semiconductor manufacturing parameters with the corresponding SPECs, new criteria (e.g., stricter or more flexible than the existing SPECs) may be defined based on the existing SPECs. The actual semiconductor manufacturing parameters can then be compared with the new criteria in certain situations.

Accordingly, for the system for the automated data collection with the new criteria, the MES may also determine whether a reported semiconductor manufacturing parameter exceeds the range defined by the new criteria. If the reported semiconductor manufacturing parameter does not exceed the range, the MES can allow the vacuum chambers and/or the gas lines corresponding to the manufacturing equipment to continue manufacturing, and the MES can update the ITC of the semiconductor manufacturing parameter. If the reported semiconductor manufacturing parameter exceeds the range, the MES can stop the vacuum chambers and/or the gas lines corresponding to the manufacturing equipment from continuing manufacturing, and the MES may not update the ITC of the semiconductor manufacturing parameter. Also, the MES can set the vacuum chambers and/or the gas lines corresponding to the manufacturing equipment to be in a malfunctioning status handling program.

Figure 4:
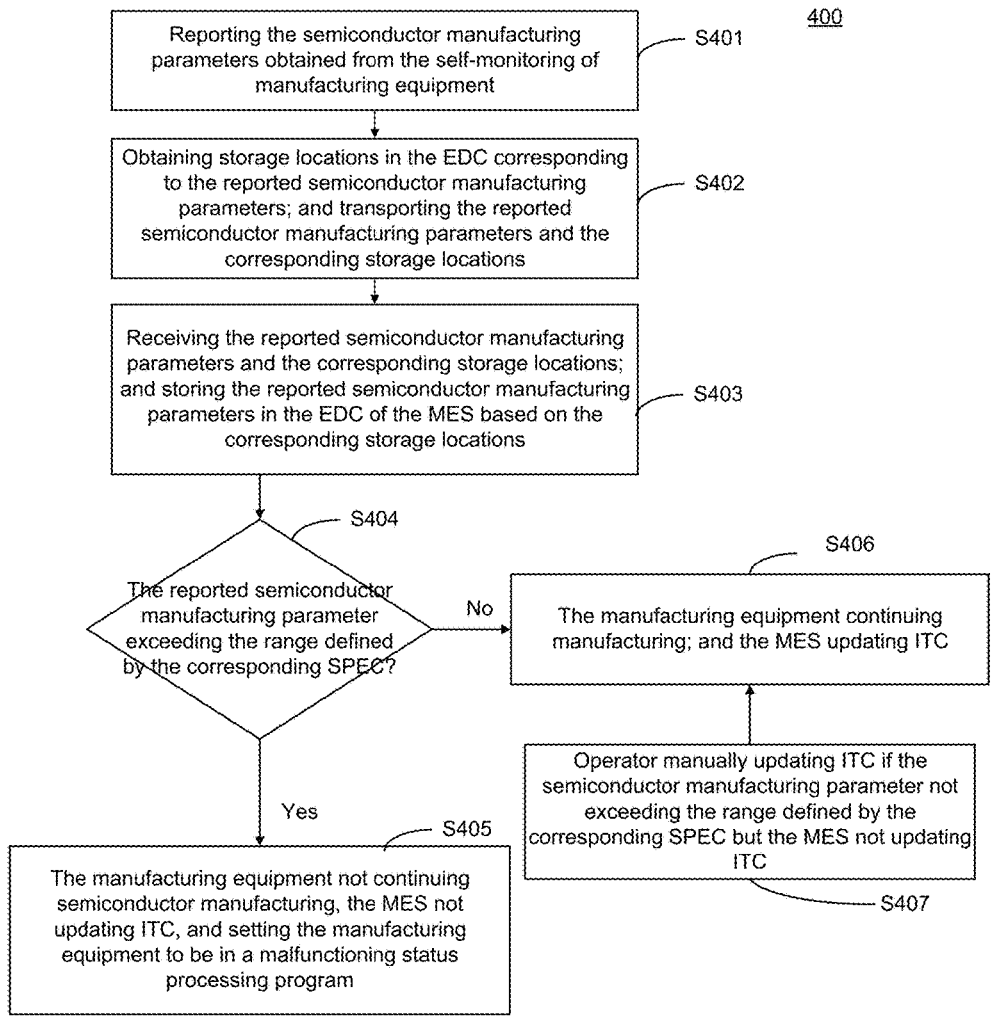
FIG. 4 illustrates a flow chart of another exemplary semiconductor manufacturing parameter collection process consistent with the disclosed embodiments.

FIG. 4 illustrates a flow chart of another exemplary semiconductor manufacturing parameter collection process 400.

As shown in FIG. 4, steps S401, S402, and S403 in the process 400 may correspond to steps S101, S102, and S103 in the process 100 illustrated in FIG. 1 for automatically collecting semiconductor manufacturing parameters obtained from self-monitoring of the manufacturing equipment. Step S404 can be used to determine whether a semiconductor manufacturing parameter is out of the range defined by the corresponding SPEC. If the semiconductor manufacturing parameter does not exceed the range, the process goes to step S406. If the semiconductor parameter exceeds the range, the process goes to step S405. The functions of steps S404, S405, and S406 can be referred to the functions of steps S304, S305, and S306, and are omitted herein.

In the previous embodiments illustrated in FIG. 3, under normal circumstance, if the reported semiconductor manufacturing parameter does not exceed the range defined by the corresponding SPEC, the MES can allow the vacuum chambers and/or the gas lines corresponding to the manufacturing equipment to continue manufacturing and may update the ITC of the semiconductor manufacturing parameter. In practice, it is also possible that the reported semiconductor manufacturing parameter does not exceed the range, but MES does not automatically update the ITC of the semiconductor manufacturing parameter. To avoid such scenario, the ITC of the semiconductor manufacturing parameter can be configured to allow being updated manually by a process engineer or an operator.

Thus, compared to the semiconductor manufacturing parameter collection process 300, the process 400 illustrated FIG. 4 may further include a step (S407) to allow the ITC of the semiconductor manufacturing parameter to be manually updated under the condition that the semiconductor manufacturing parameter is within the range defined by the SPEC but MES does not automatically update the ITC of the semiconductor manufacturing parameter.

Figure 5:
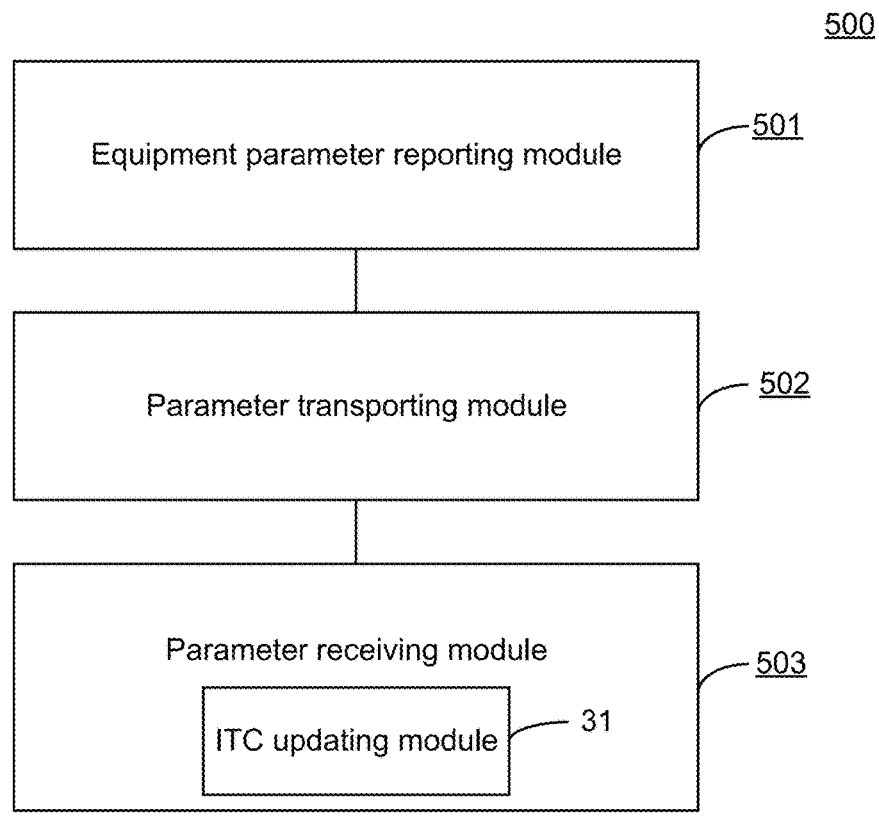
FIG. 5 illustrates a block diagram of another exemplary semiconductor manufacturing parameter collection system consistent with the disclosed embodiments.

FIG. 5 illustrates a block diagram of a system 500 corresponding to the semiconductor manufacturing parameter collection process illustrated in FIG. 4. Compared to the system shown in FIG. 2, the equipment parameter reporting module 501 may have the same functions as the equipment parameter reporting module 1. The parameter transporting module 502 may have the same functions as the parameter transporting module 2. Compared to the parameter receiving module 3, the parameter receiving module 503 may further include functions of the ITC updating module 31.

The ITC updating module 31 can allow the ITC to be manually updated when a reported semiconductor manufacturing parameter does not exceed the range defined by the corresponding SPEC but the MES does not update the ITC of the semiconductor manufacturing parameter automatically.

Figure 9:
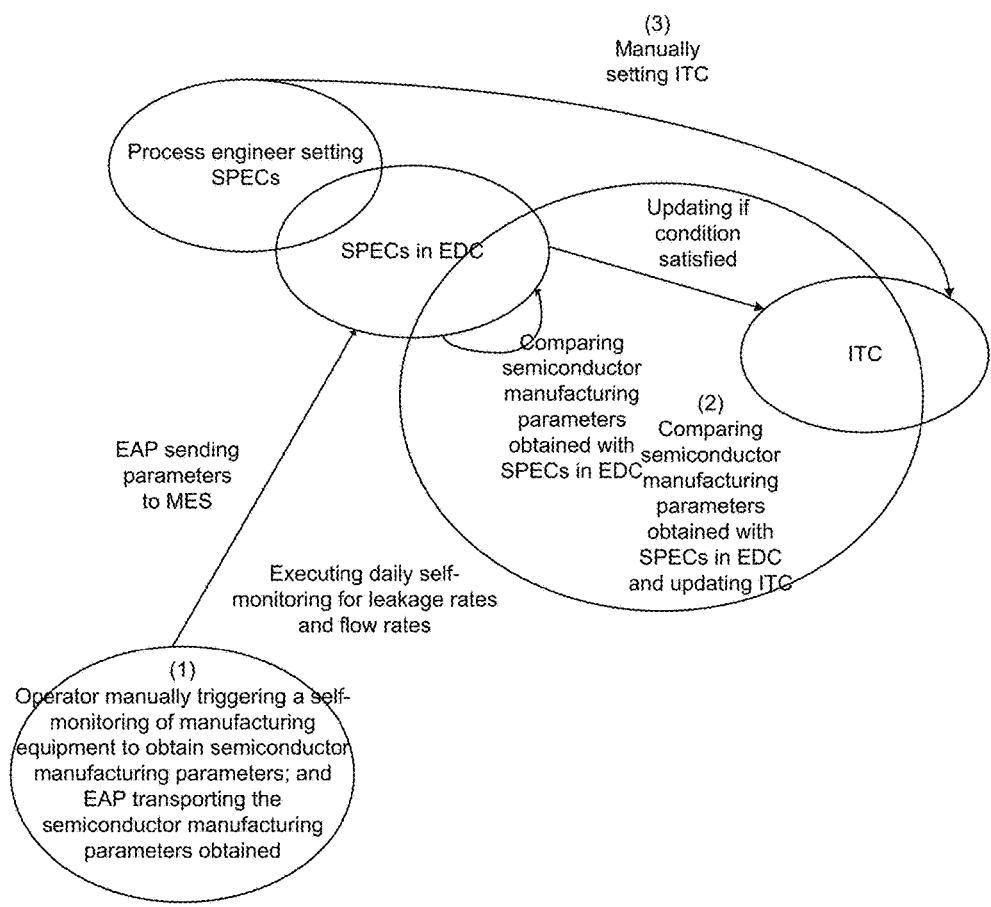
FIG. 9 illustrates another exemplary semiconductor manufacturing parameter collection process consistent with the disclosed embodiments.

The method disclosed for automatically collecting semiconductor manufacturing parameters, e.g., leakage rates and/or flow rates, can be further exemplified in FIG. 9.

FIG. 9 illustrates process of an exemplary semiconductor manufacturing parameters collection process. Semiconductor manufacturing parameters such as leakage rates and flow rates can be automatically collected by through the process illustrated in FIG. 9. Before the procedure starts, a process engineer can set SPECs for the semiconductor manufacturing parameters collected from the self-monitoring. Each SPEC may include criteria to be compared with semiconductor manufacturing parameters obtained from the self-monitoring. Some SPECs can be stored in the EDC. The process of the monitoring procedure can be illustrated in the following 3 steps. Other steps may also be added.

In step (1), an operator may manually trigger self-monitoring or self-check of a manufacturing equipment to obtain semiconductor manufacturing parameters. The data obtained may be reported to the EAP module. The EAP module may transport the data obtained to the EDC in the MES according to a certain format/rule. The semiconductor manufacturing parameters obtained may be semiconductor manufacturing parameters such as leakage rates of flow meters in vacuums and/or flow rates of mass flow controllers in gas lines. The self-monitoring may be a daily self-monitoring procedure of the manufacturing equipment.

In step (2), the MES may receive the semiconductor manufacturing parameters transported and compare each semiconductor manufacturing parameters with the corresponding SPEC stored in the EDC. The MES may update the corresponding ITC of the semiconductor manufacturing parameter if the semiconductor manufacturing parameter is within the range defined by the corresponding SPEC in the EDC. If the semiconductor manufacturing parameter is out of the range defined by the corresponding SPEC in the EDC, the MES may not update the corresponding ITC of the semiconductor manufacturing parameter.

In step (3), a process engineer can manually update the corresponding ITC of the semiconductor manufacturing parameter if the semiconductor manufacturing parameter obtained from the self-monitoring is within the range defined by the corresponding SPEC but MES does not automatically update the corresponding ITC of the semiconductor manufacturing parameter.

Figure 10:
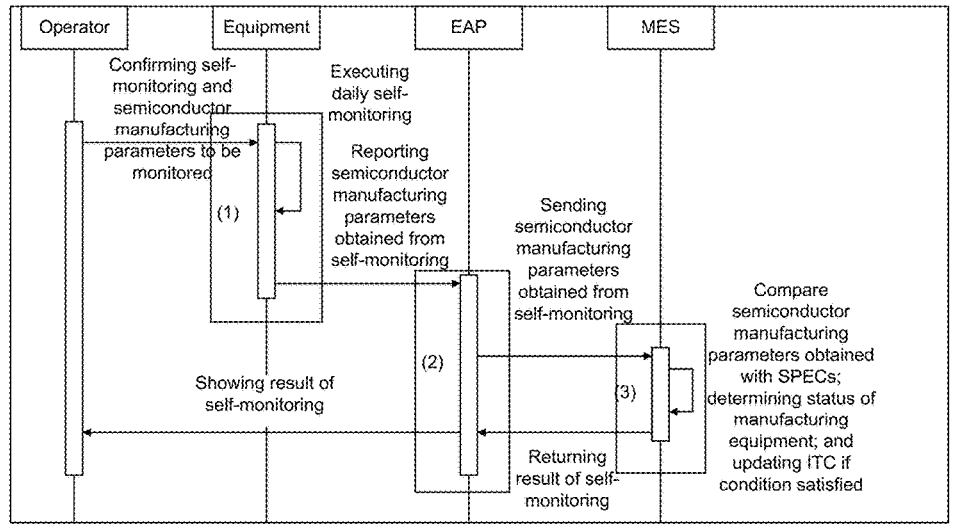
FIG. 10 illustrates sequence diagram in an exemplary semiconductor manufacturing parameter collection system consistent with the disclosed embodiments.

FIG. 10 illustrates a sequence diagram of an exemplary semiconductor manufacturing parameter collection system. The sequence diagram may show interactions between the operator, the manufacturing equipment, the EAP, and the MES in the system.

Action/Step (1) may represent the actions or steps taken by the manufacturing equipment for interacting with the operator and the EAP. The manufacturing equipment may accept the confirmation from the operator to start the self-monitoring after the operator selects semiconductor manufacturing parameters to be monitored. The manufacturing equipment may execute the self-monitoring and report the semiconductor manufacturing parameters obtained from the self-monitoring to the EAP.

An operator may confirm the semiconductor manufacturing parameters to be monitored by clicking on suitable buttons on the manufacturing equipment such that commands for self-monitoring can be inputted into the manufacturing equipment. The manufacturing equipment may execute the self-monitoring, e.g., a daily self-monitoring procedure, to obtain data such as leakage rates and/or flow rates in the manufacturing equipment. Then, the manufacturing equipment may report the obtained leakage rates and/or flow rates to the EAP.

In the manufacturing equipment, suitable software may be needed to obtain leakage rates and flow rates from self-monitoring devices such as flow meters or mass flow controllers. The manufacturing equipment can assign a CEID and a SVID to each leakage rate and each flow rate such that the leakage rates and flow rates can be reported to the EAP by the manufacturing equipment after the self-monitoring is completed.

Action/Step (2) may represent the actions or steps taken by the EAP for interacting with the manufacturing equipment and the MES. The EAP may accept the reported semiconductor manufacturing parameters from the manufacturing equipment and send the reported manufacturing parameters with corresponding data to the MES according to a certain format/rule.

After the EAP receives a request for data transporting from the manufacturing equipment, the EAP may obtain a SPEC ID from the MES for each leakage rate and each flow rate. The SPEC ID of a leakage rate/flow rate is obtained based on the CEID and the SVID of the leakage rate/flow rate. The EAP may obtain a unique Chart ID for each leakage rate/flow rate based on the SPEC ID of each leakage rate/flow rate and the EQPID corresponding to each leakage rate/flow rate. The EAP may assort the Chart ID, the CEID, the SVID, and the SPEC ID of each leakage rate/flow rate according to a certain format/rule, and send the assorted/formatted data to the MES.

Action/Step (3) may represent the actions or steps taken by the MES for interacting with the EAP and the operator. The MES may accept and store the reported semiconductor manufacturing parameters from the EAP, compare each semiconductor manufacturing parameter with corresponding SPEC, determine the status of the manufacturing equipment, and update the ITC for the semiconductor manufacturing parameter if a certain condition is satisfied. The MES may further return the result the self-monitoring to the operator.

After The MES receives the assorted/formatted data sent from the EAP, the MES can compare each semiconductor manufacturing parameter obtained with corresponding SPEC or SPEC table (i.e., predetermined criteria) stored in the EDC of the MES. The MES may allow the manufacturing equipment to continue manufacturing and update the ITC of the semiconductor manufacturing parameter if the condition, i.e., the semiconductor manufacturing parameter obtained is within the range defined by the corresponding SPEC, is satisfied. The MES may stop the manufacturing equipment from continue manufacturing and may not update the ITC of the semiconductor manufacturing parameter if the semiconductor manufacturing parameter obtained exceeds the range defined by the corresponding SPEC. Also, if the semiconductor manufacturing parameter obtained exceeds the range defined by the SPEC, the MES may set the manufacturing equipment to be in a malfunctioning status handling program for handling OOC/OOS (out-of-control/ out-of-specification) situations according to a standard operating procedure (SOP). If the semiconductor manufacturing parameter obtained does not exceed the range defined by the SPEC, and the MES does not automatically update the ITC of the semiconductor manufacturing parameter, the ITC of the semiconductor manufacturing parameter can be updated by, for example, a process engineer. Then, the MES may return the result of the self-monitoring to the operator.

Figure 11:
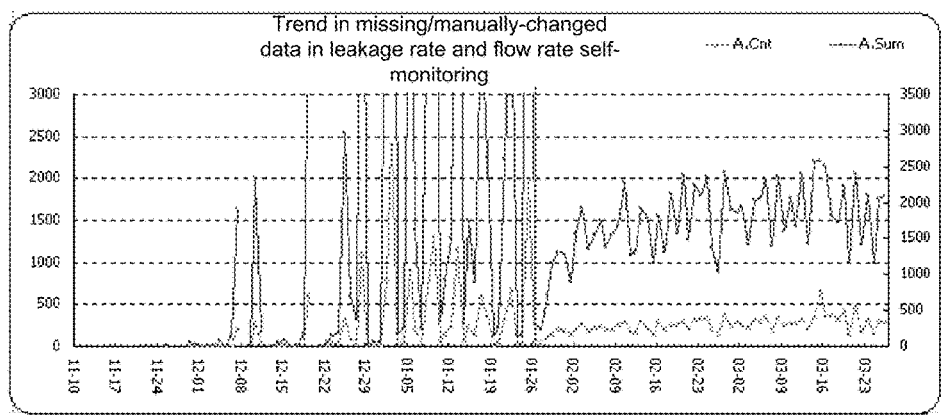
FIG. 11 illustrates certain data regarding using the disclosed semiconductor manufacturing data collection system consistent with the disclosed embodiments.

FIG. 11 illustrates certain data regarding using the disclosed semiconductor manufacturing data collection system for collecting semiconductor manufacturing parameters, e.g., leakage rates and flow rates, in a time period. It can be seen that, using the disclosed method for automatically collecting semiconductor manufacturing parameters, the incidence of missing data and manually-changed data (lower line) is significantly lower. The system can perform self-monitoring approximately 222,620 times/month. The incidence of missing data and manually-changed data is close to 0. Work load for operators can be greatly reduced and production can be increased. Accuracy of the semiconductor manufacturing parameters obtained from self-monitoring has been greatly improved, and status of the semiconductor manufacturing processes can be more accurately reflected.

Compared to an existing method and system for automated data collection in semiconductor manufacturing processes, the present disclosure has the following advantageous aspects and implementations.

1) First, the equipment parameter reporting module may report the actual semiconductor manufacturing parameters collected from the self-monitoring of manufacturing equipment to the parameter transporting module. The actual semiconductor manufacturing parameters obtain corresponding storage locations in the EDC in the parameter transporting module. The parameter transporting module transports the reported semiconductor manufacturing parameters and the corresponding storage locations to the parameter receiving module. The parameter receiving module stores the reported actual semiconductor manufacturing parameters in the EDC of the MES based on the storage locations received. Automated inputting and outputting of the data obtained from the self-monitoring of the manufacturing equipment can be realized using the method above. Issues such as missing data and manually-changed data can be eliminated. The status of the semiconductor manufacturing processes can be more accurately reflected. Production efficiency can be improved. Production quality management and manufacturing management can also be improved.

2) The parameter receiving module may be a sub-module of the MES, and the EDC storing the corresponding storage locations of the reported actual semiconductor manufacturing parameters also stores corresponding SPECs for the reported semiconductor manufacturing parameters. The MES determines whether the manufacturing equipment can continue manufacturing based on the reported semiconductor manufacturing parameters and the corresponding SPECs. After the actual semiconductor manufacturing parameters are collected automatically, the MES receives the actual semiconductor manufacturing parameters and controls whether the manufacturing equipment can continue manufacturing based on the actual data received. For example, The MES controls whether the manufacturing equipment can continue processing wafers.

3) Each manufacturing equipment may correspond to a plurality of vacuum chambers and/or a plurality of gas lines. That is, the semiconductor manufacturing parameters obtained from the self-monitoring of each manufacturing equipment can include leakage rates of a plurality of vacuum chambers, flow rates of mass flow controllers in gas lines, and so on. The method for collecting two types of data from the self-monitoring of the manufacturing equipment is provided. In addition, each manufacturing equipment corresponds to one equipment reporting parameter module and one parameter transporting module. Equipment parameter reporting modules of a plural manufacturing equipment correspond to one parameter receiving module. Parameter transporting modules of a plurality of manufacturing equipment correspond to one parameter receiving module.

4) The parameter transporting module may be a sub-module of the EAP module. The disclosed methods take advantage of the existing EAP module and add more functions to the EAP module.

5) The equipment parameter reporting module can be triggered/enabled by self-monitoring devices. That is, a self-monitoring device completes the self-monitoring to obtain semiconductor manufacturing parameters. The self-monitoring device reports the semiconductor manufacturing parameters obtained immediately after the self-monitoring. The self-monitoring device can be a leakage rate measuring device in a vacuum chamber, a flow rate meter in a gas line, and so on. The disclosed methods provide a method for data reporting.

6) The equipment parameter reporting module may also report the SVID and CEID of each semiconductor manufacturing parameter. The SPEC ID or monitoring parameter type of each semiconductor manufacturing parameter can be obtained based on the SVID and the CEID of the semiconductor manufacturing parameter. The SPEC ID represents the type (i.e., leakage rate or gas flow rate) of a reported semiconductor manufacturing parameter.

7) According to 6) above, each manufacturing equipment may have an EQPID. The parameter transporting module obtains all Chart IDs suitable for the reported semiconductor manufacturing parameters from the EDC of the MES based on the EQPID of the manufacturing equipment and SPEC IDs of the reported semiconductor manufacturing parameters. The parameter transporting module then obtains a unique Chart ID for each reported semiconductor manufacturing parameter based on the SVID and the CEID of the semiconductor manufacturing parameter. The unique Chart ID corresponds to the storage location of the semiconductor manufacturing parameter. A plurality of Chart IDs configured to represent a certain SPEC ID (e.g., leakage rate) of a certain manufacturing equipment are stored in the EDC of the MES. For example, a manufacturing equipment corresponds to a plurality of vacuum chambers. Based on the SVID and the CEID of a reported semiconductor manufacturing parameter, the vacuum chamber corresponding to the semiconductor manufacturing parameter can be determined. That is, the unique storage location in the EDC for storing the reported semiconductor manufacturing parameter can be determined.

8) According to 2) above, the MES determines whether the reported semiconductor manufacturing parameter may exceed the corresponding SPEC. If the reported semiconductor manufacturing parameter does not exceed range defined by the corresponding SPEC, the MES allows the vacuum chambers and/or the gas lines corresponding to the manufacturing equipment to continue manufacturing, and updates the ITC of the semiconductor manufacturing parameter. If the reported semiconductor manufacturing parameter exceeds the range defined by the corresponding SPEC, the MES stops the vacuum chambers and/or the gas lines corresponding to the manufacturing equipment from manufacturing and does not update the ITC of the semiconductor manufacturing parameter. The vacuum chambers or the gas lines corresponding to the manufacturing equipment are then set to be in a malfunctioning status handling program. The disclosed methods provide a detailed solution for determining whether certain manufacturing equipment can continue manufacturing. In addition to the direct comparison between an actual semiconductor manufacturing parameter and the existing SPEC, new criteria can also be defined based on the existing SPEC. The new criteria can be compared with the actual semiconductor manufacturing parameter.

9) According to 8) above, it may also be possible that a reported semiconductor manufacturing parameter does not exceed the range defined by the corresponding SPEC, but the ITC of the semiconductor manufacturing parameter may be not updated automatically. To avoid the above scenario, the ITC of the semiconductor manufacturing parameter can be manually updated.

The present embodiments provide a method and system for automatically collecting semiconductor manufacturing parameters. Other applications, advantages, alternations, modifications, or equivalents to the disclosed embodiments are obvious to those skilled in the art. It is intended that the specification and examples be considered as exemplary only, with a true scope and spirit of the invention being indicated by the claims.

What is claimed is:

1. A method for automatically collecting semiconductor manufacturing parameters of a manufacturing equipment, comprising:
    reporting semiconductor manufacturing parameters obtained by self-monitoring of the manufacturing equipment, wherein each semiconductor manufacturing parameter has a state variable identifier and a collected event identifier such that each semiconductor manufacturing parameter is reported with the state variable identifier and the collected event identifier to obtain a measurement specification identifier for each semiconductor manufacturing parameter;
    obtaining storage locations in an electronic data capture corresponding to reported semiconductor manufacturing parameters and transporting the reported semiconductor manufacturing parameters and corresponding storage locations;
    receiving the reported semiconductor manufacturing parameters and the corresponding storage location and storing each reported semiconductor manufacturing parameters automatically into the electronic data capture of a manufacturing execution system according to the corresponding storage location, wherein the electronic data capture storing the storage locations also includes allowable specification for each reported semiconductor manufacturing parameter;
    comparing between a reported semiconductor manufacturing parameter and a corresponding allowable specification; and
    continuing a normal manufacturing operation of the manufacturing equipment when the reported semiconductor manufacturing parameter does not exceed a range defined by the corresponding allowable specification.

2. The method according to claim 1, wherein the manufacturing equipment corresponds to one or more vacuum chambers, one or more gas lines, or a combination of one or more vacuum chambers and one or more gas lines.

3. The method according to claim 2, wherein when the reported semiconductor manufacturing parameter exceeds the range defined by the corresponding allowable specification, the manufacturing execution system stops the vacuum chambers or gas lines corresponding to the manufacturing equipment from continuing operation, disallows updating the idle time constraint of the semiconductor manufacturing parameter, and sets the vacuum chambers or the gas lines corresponding to the manufacturing equipment to be in a malfunctioning status handling program.

4. The method according to claim 3, wherein when the reported semiconductor manufacturing parameter does not exceed the range defined by the corresponding allowable specification, and the manufacturing execution system does not update the idle time constraint of the semiconductor manufacturing parameter, the idle time constraint of the semiconductor manufacturing parameter is allowed to be updated manually.

5. The method according to claim 2, wherein continuing the normal manufacturing operation of the manufacturing equipment includes:
    continuing operation of vacuum chambers or gas lines corresponding to the manufacturing equipment, wherein the manufacturing execution system updates an idle time constraint of the semiconductor manufacturing parameter.

6. A method for automatically collecting semiconductor manufacturing parameters of a manufacturing equipment, comprising:
    reporting semiconductor manufacturing parameters obtained by self-monitoring of the manufacturing equipment;
    obtaining storage locations in an electronic data capture corresponding to reported semiconductor manufacturing parameters and transporting the reported semiconductor manufacturing parameters and corresponding storage locations;
    receiving the reported semiconductor manufacturing parameters and the corresponding storage location and storing each reported semiconductor manufacturing parameters automatically into the electronic data capture of a manufacturing execution system according to the corresponding storage location, wherein;
    the manufacturing equipment corresponds to one or more vacuum chambers, one or more gas lines, or a combination of one or more vacuum chambers and one or more gas lines; and
    each semiconductor manufacturing parameter obtained from the self-monitoring of the manufacturing equipment has a state variable identifier and a collected event identifier such that each semiconductor manufacturing parameter is reported with the state variable identifier and the collected event identifier to obtain a measurement specification identifier for each semiconductor manufacturing parameter comparing between a reported semiconductor manufacturing parameter and a corresponding allowable specification; and continuing a normal manufacturing operation of the manufacturing equipment when the reported semiconductor manufacturing parameter does not exceed a range defined by the corresponding allowable specification.

7. The method according to claim 6, wherein
the measurement specification identifier includes a leakage rate of a vacuum chamber or a flow rate of a mass flow controller in a gas line.

8. The method according to claim 6, wherein
an equipment identifier of the manufacturing equipment and the measurement specification identifier of each reported semiconductor manufacturing parameter collected from self-monitoring of the manufacturing equipment are used to obtain a plurality of character identifiers suitable for each reported semiconductor manufacturing parameter from the electronic data capture; and the state variable identifier and the collected event identifier of the semiconductor manufacturing parameter are used to uniquely identify each reported semiconductor manufacturing parameter.

9. A system for collecting semiconductor manufacturing parameters, comprising:
an equipment parameter reporting module configured to report semiconductor manufacturing parameters obtained from self-monitoring of a manufacturing equipment;
a parameter transporting module configured to obtain storage location in an electronic data capture for each reported semiconductor manufacturing parameter and transport the reported semiconductor manufacturing parameters and corresponding storage locations; and
a parameter receiving module configured to receive the reported semiconductor manufacturing parameters and the corresponding storage locations and store each reported semiconductor manufacturing parameter automatically into the electronic data capture of a manufacturing execution system according to the corresponding storage location of each reported semiconductor manufacturing parameter, wherein the electronic data capture storing the storage locations also includes allowable specification for each reported semiconductor manufacturing parameter;
a comparing module configured to compare between a reported semiconductor manufacturing parameter and a corresponding allowable specification; and
a determining module configured to continue a normal manufacturing operation of the manufacturing equipment when the reported semiconductor manufacturing parameter does not exceed a range defined by the corresponding allowable specification.

10. The system according to claim 9, wherein
the parameter receiving module is a sub-module of the manufacturing execution system; and
the electronic data capture storing the storage locations of the reported semiconductor manufacturing parameters also stores corresponding allowable specification for each reported semiconductor manufacturing parameter.

11. The system according to claim 10, wherein:
when the reported semiconductor manufacturing parameter exceeds the range defined by the corresponding allowable specification, the manufacturing execution system stops the vacuum chambers or gas lines corresponding to the manufacturing equipment from continuing operation, disallows updating a corresponding idle time constraint of the semiconductor manufacturing parameter, and sets the vacuum chambers or the gas lines corresponding to the manufacturing equipment to be in a malfunctioning status handling program.

12. The system according to claim 11, wherein:
the manufacturing execution system further includes an idle time constraint updating module to enable manually updating the idle time constraint of the reported semiconductor manufacturing parameter when the reported semiconductor manufacturing parameter does not exceed the range defined by the allowable specification but the manufacturing execution system does not automatically update the idle time constraint of the reported semiconductor manufacturing parameter.

13. The system according to claim 10, wherein continuing the normal manufacturing operation of the manufacturing equipment includes:
continuing operation of vacuum chambers or gas lines corresponding to the manufacturing equipment, wherein the manufacturing execution system updates an idle time constraint of the semiconductor manufacturing parameter.

14. The system according to claim 9, wherein:
one manufacturing equipment corresponds to one or more vacuum chambers, one or more gas lines, or a combination of one or more vacuum chambers and one or more gas lines; and
one manufacturing equipment corresponds to one equipment parameter reporting module and one parameter transporting module.

15. The system according to claim 9, wherein
the parameter transporting module is a sub-module of an equipment automation process module.

16. The system according to claim 9, wherein the equipment parameter reporting module is enabled by triggering information of a self-monitoring device.

17. The system according to claim 16, wherein:
a self-monitoring device includes a leakage rate measuring device in a vacuum chamber, a mass flow rate controller in a gas line, or a combination of a leakage rate measuring device in a vacuum chamber and a mass flow rate controller in a gas line.

18. The system according to claim 9, wherein
the equipment parameter reporting module further reports a state variable identifier and a collected event identifier of each reported semiconductor manufacturing parameter to obtain a measurement specification identifier of the reported semiconductor manufacturing parameter.

19. The system according to claim 18, wherein
an equipment identifier of each manufacturing equipment and the measurement specification identifier of each reported semiconductor manufacturing parameter collected from self-monitoring of the manufacturing equipment are used to obtain a plurality of character identifiers suitable for each reported semiconductor manufacturing parameter from the electronic data capture; and
the state variable identifier and the collected event identifier of each semiconductor manufacturing parameter are used to uniquely identify each reported semiconductor manufacturing parameter.

\* \* \* \* \*